United States Patent
Ta et al.

(10) Patent No.: US 11,887,163 B2
(45) Date of Patent: *Jan. 30, 2024

(54) SYSTEM AND METHOD FOR MOBILE GIG LOCKER

(71) Applicant: Productive Application Solutions, Inc., Sheridan, WY (US)

(72) Inventors: Peter Ta, Tucson, AZ (US); Gerald Maliszewski, San Diego, CA (US)

(73) Assignee: Productive Applicant Solutions, Inc., Sheridan, WY (US)

( * ) Notice: Subject to any disclaimer, the term of this patent is extended or adjusted under 35 U.S.C. 154(b) by 707 days.

This patent is subject to a terminal disclaimer.

(21) Appl. No.: 17/097,256

(22) Filed: Nov. 13, 2020

(65) Prior Publication Data
US 2021/0065242 A1    Mar. 4, 2021

Related U.S. Application Data

(63) Continuation-in-part of application No. 17/071,043, filed on Oct. 15, 2020, which is a continuation-in-part
(Continued)

(51) Int. Cl.
G06Q 30/00        (2023.01)
G06Q 30/0251      (2023.01)
G06Q 30/0242      (2023.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0244; G06Q 30/0252; G06Q 30/0267
(Continued)

(56) References Cited

U.S. PATENT DOCUMENTS 6,882,269 B2 * 4/2005 Moreno ............... A47G 29/141
                                                      340/568.1
9,076,336 B2 * 7/2015 Tippelhofer ........... G08G 1/148
(Continued)

FOREIGN PATENT DOCUMENTS

FR    2578996 A1 *  9/1986 ............. G09F 21/04
GB    2402254 A  * 12/2004 ........... G06Q 20/127
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

A mobile locker system is provided having a security mechanism permitting an agent to access the locker parked at a temporary product exchange station, and an exchange mechanism directing the agent to the station location. The agent can be a delivery agent inserting the product into the locker or a receiving agent removing the product from the locker. The locker may be attached to a mobile platform, such as an automotive vehicle. A communications subsystem transmits an identifier associated with the agent accessing the locker, an identifier associated with the locker, and the geographic location of the locker to a server. An ordering mechanism accepts product orders, product exchange station location requests, or both, from a receiving agent, and has an interface to supply the ordered product to a delivery exchange mechanism. A receiving exchange mechanism passes the locker information to the receiving agent.

33 Claims, 8 Drawing Sheets

Related U.S. Application Data of application No. 17/023,546, filed on Sep. 17, 2020, which is a continuation-in-part of application No. 17/007,575, filed on Aug. 31, 2020, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | |
|---|---|---|---|
| 9,424,702 B2* | 8/2016 | Ogishi | G07C 9/00912 |
| 10,096,183 B2* | 10/2018 | Nitu | G07F 9/001 |
| 10,198,887 B2* | 2/2019 | Ogishi | G07C 9/38 |
| 10,345,818 B2 | 7/2019 | Sibley | |
| 10,551,851 B2* | 2/2020 | Yu | G05D 1/0297 |
| 10,629,017 B2* | 4/2020 | Ogishi | G07C 9/38 |
| 10,719,805 B2 | 7/2020 | Ferguson et al. | |
| 11,341,800 B2* | 5/2022 | Nitu | G07C 9/00904 |
| 11,375,839 B2* | 7/2022 | Santangeli | G07C 9/00571 |
| 11,562,318 B2* | 1/2023 | Robinson | G06Q 10/0836 |
| 2002/0009978 A1* | 1/2002 | Dukach | G08G 1/01 455/99 |
| 2002/0035515 A1* | 3/2002 | Moreno | B65G 1/0485 340/5.73 |
| 2002/0116289 A1* | 8/2002 | Yang | G06Q 10/08 705/26.81 |
| 2004/0073449 A1* | 4/2004 | Yang | G06Q 10/08 705/330 |
| 2004/0177008 A1* | 9/2004 | Yang | G06Q 30/0601 705/26.1 |
| 2011/0131235 A1* | 6/2011 | Petrou | G06F 16/532 707/769 |
| 2012/0245966 A1* | 9/2012 | Volz | G06Q 10/02 705/5 |
| 2013/0307706 A1* | 11/2013 | Kriezman | B60Q 1/503 340/988 |
| 2014/0035721 A1 | 2/2014 | Heppe et al. | |
| 2014/0214319 A1* | 7/2014 | Vucetic | G01C 21/3446 701/533 |
| 2015/0006005 A1* | 1/2015 | Yu | B60P 3/007 701/22 |
| 2015/0123818 A1* | 5/2015 | Sellschopp | G08G 1/096816 340/932.2 |
| 2015/0254721 A1* | 9/2015 | Rad | G06Q 30/0266 705/14.63 |
| 2015/0279210 A1* | 10/2015 | Zafiroglu | G08G 1/065 340/932.2 |
| 2015/0348345 A1* | 12/2015 | Ogishi | G06Q 10/083 340/5.6 |
| 2015/0356801 A1* | 12/2015 | Nitu | G07F 9/002 340/5.61 |
| 2016/0116293 A1* | 4/2016 | Grover | G01C 21/34 701/23 |
| 2016/0335822 A1* | 11/2016 | Ogishi | G07C 9/38 |
| 2017/0301220 A1* | 10/2017 | Jarrell | G05D 1/0022 |
| 2017/0309170 A1* | 10/2017 | Wang | G08G 1/146 |
| 2018/0186309 A1* | 7/2018 | Batten | B60Q 1/56 |
| 2018/0186311 A1* | 7/2018 | Mason | B60R 21/01 |
| 2019/0287063 A1* | 9/2019 | Skaaksrud | G08G 1/202 |
| 2019/0340860 A1* | 11/2019 | Ogishi | G07C 9/38 |
| 2020/0187694 A1* | 6/2020 | Santangeli | G07C 9/00309 |
| 2022/0296024 A1* | 9/2022 | Santangeli | G07C 9/00912 |
| 2022/0311480 A1* | 9/2022 | Wagner | H04B 7/0417 |
| 2023/0176588 A1* | 6/2023 | Yu | G05D 1/024 701/22 |

FOREIGN PATENT DOCUMENTS

| | | | | |
|---|---|---|---|---|
| JP | 2010026474 A | * | 2/2010 | .......... G09F 21/048 |
| JP | 2018072077 A | * | 5/2018 | ............ G01S 19/14 |
| JP | 2018205399 A | * | 12/2018 | |
| WO | WO-2008135617 A1 | * | 11/2008 | .......... G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

* cited by examiner

SYSTEM AND METHOD FOR MOBILE GIG LOCKER

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to mobile delivery and storage networks and, more particularly, to a system and method for improved delivery logistics through the use of mobile lockers.

2. Description of the Related Art

Automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, describes an automotive targeted parking system that includes a media display subsystem, and which may also include a Wireless Local Area Network (WLAN) IEEE 802.11 (WiFi) access point (hotspot). In a similar vein, U.S. Ser. No. 17/071,043, entitled SYSTEM AND METHOD FOR GIG VEHICLE PARKING describes a means of more efficiently moving vehicles to desired parking locations.

It would be advantageous if an automobile could be used as portable real estate, capable of acting as a delivery system and storage locker.

It would be advantageous if the system could move the mobile storage lockers to desired parking locations based upon customer need and convenience.

It would be advantageous if the parking locations to which the mobile lockers are moved could be monitored and controlled, and the transfer of delivery items verified.

SUMMARY OF THE INVENTION

A system and method are disclosed herein for mobile platform positioning, for use as a mobile locker delivery means. The mobile locker is typically attached to a mobile platform such as an automotive vehicle. The locker has a security mechanism that permits it to be opened by a trusted agent capable of loading a product into the locker, or unloading a product. Since the locker is mobile, it is therefore not located in a permanent location. Unlike a delivery or pick-up service, the lockers are set up at temporary stations, and an exchange mechanism associated with the locker is able to supply station location information to the agent. The system may transmit the following information: (i) a unique identifier for the locker and agent, (ii) the time, date, location, and duration of locker use, (iii) and an indication that the locker is able to receive a product, or that is contains a product for delivery. Graphic Information System (GIS) mapping technology may be used to compensate a person or business entity associated with the system for operating in specified locations, or for the temporary use of vehicles. The mobile locker can be used in combination with a system that permits the lockers to be moved to desired locations using a network of trusted parking agents. The mobile locker can also be used in combination with a system that allows owners to offer their vehicles as mobile locker platforms.

Accordingly, a mobile locker system is provided with a mobile locker capable of containing or holding a product. The locker is configured such that it can be parked at a temporary product exchange station. A locker security mechanism permits a trusted agent to access the locker, and an exchange mechanism has an interface directing the agent to the product exchange station location. The trusted agent can be a delivery agent inserting the product into the locker, or a receiving agent removing the product from the locker. Typically, the exchange mechanism is a portal incorporating a software application, supplying the agent with a locker identifier, a locker access mechanism, and the product exchange station location. In one aspect the locker is configured for attachment to a mobile platform, such as an automotive vehicle. A location subsystem can also be configured for attachment to the locker, to determine the geographic location of the locker. A communications subsystem, if used with the locker system, has an interface to receive verification information including an identifier associated with the agent accessing the locker, an identifier associated with the locker, and the geographic location of the locker. The communications subsystem has an interface to transmit the verification information to a server.

In one aspect, the system includes an ordering mechanism having an interface to accept product orders, product exchange station location requests, or both, from an agent, and an interface to supply the ordered product to a delivery exchange mechanism. Again, the ordering mechanism may be a portal incorporating a software application. Thus, the exchange mechanism may select the product exchange station location in response to location requests from a receiving agent or a delivery agent.

The product exchange station location need not be at a fixed location between the time in which the product is inserted and when the product is removed. In one aspect, the exchange mechanism establishes a product exchange station location that is a mobile platform route. The route may be predetermined, have predetermined stops along a predetermined route, and have times corresponding to stops along the route. For example, the mobile locker may be attached to a FedEx® delivery truck that follows a proscribed daily route, and stops can be predetermined or arranged on-the-fly. Alternatively, the mobile platform may follow a random, non-predetermined route and the exchange station location may be arranged with an agent on-the-fly.

In one aspect, a first entity (e.g., an online product source business) may control the ordering mechanism and receive product orders from a second entity (e.g., a customer). The first entity may also control a delivery exchange mechanism to supply a delivery agent with a locker identifier, a locker access mechanism, and a product delivery exchange station location. The first entity may further control a receiving exchange mechanism, supplying a receiving agent associated with the second entity, with a locker identifier, a locker access mechanism, and a product receiving exchange station location. Alternatively, the delivery and receiving exchange mechanisms may be controlled by a third entity business that manages the lockers and acts as an intermediary between the online product source business (first entity) and the customer (second entity). As another alternative, a fourth entity delivery business (e.g., FedEx®) may be the delivery exchange mechanism, acting as an intermediary between the online product source business and the receiving exchange mechanism locker management business (third entity).

The system may further include a gig mobile platform mechanism that accepts an offer from a platform owner, with the offer being to supply their mobile platform on a temporary (gig) basis for use as a mobile locker platform. If the offer is accepted, the exchange mechanism establishes a product exchange station location for the mobile platform. The exchange mechanism may supply the platform owner with a plurality of potential product exchange station locations, or require that the owner accept a predetermined product exchange station location. The product exchange station location may have a corresponding weighted value. Entities or agents associated with the mobile platform may receive rewards corresponding to the value of the product exchange station locations. The reward may be responsive to factors such as platform starting location, platform destination location, distance between starting and destination parking locations, travel time between starting and destination parking locations, time of day, day of the week, and combinations thereof.

Optionally, the mobile platform may include a publically accessible Wireless Local Area Network (WLAN) IEEE 802.11 (WiFi) hotspot, a camera, or a selectively enabled media projection subsystem. In one aspect, the system includes a secure mobile platform access mechanism that permits a trusted parking agent to temporarily gain control over the mobile platform, so that the mobile platform can be moved, and the product exchange station locations varied. Along with the above-described location and communication subsystems, a parking mechanism (e.g., enabled as a software application) supplies a destination product exchange station location to the parking agent.

Additional details of the above-described system and a corresponding gig mobile delivery method are provided below.

DETAILED DESCRIPTION

Figure 1A:
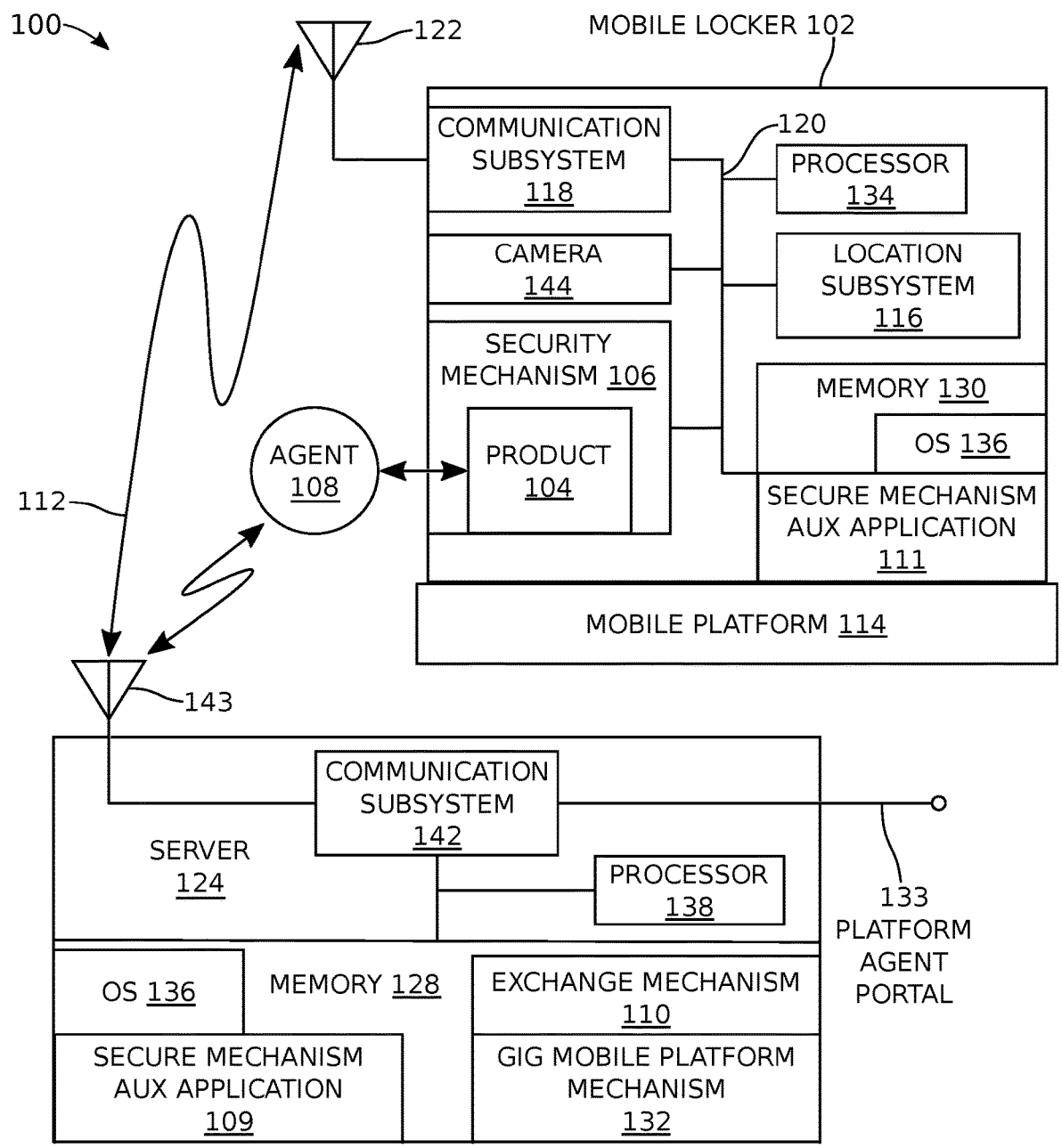
FIGS. 1A through 1D are diagrams depicting a mobile locker system.

FIGS. 1A through 1D are diagrams depicting a mobile locker system. The mobile locker system 100 comprises a mobile locker 102 capable of holding a product 104. In the case of a physical product, the locker 102 may contain the product in a locker cavity. In the case of a software product or file, the locker may be a memory accessible through a hardwired interface, such as a Universal Serial Bus (USB), or a wireless interface, such as Bluetooth. The use of locker memory may be desirable when there is fear of eavesdropping using conventional communication distribution networks. The locker 102 is capable of being parked at a temporary product exchange station. As used herein, "parking" is an operation that puts a locker, capable of mobility, into a temporary state of rest that is longer than momentary, but not permanently stationary. For example, an automobile stopping at a red light is not considered to be parked. The act of parking includes the deliberate intention to leave the locker at rest for a substantial period of time (e.g., greater than 10 minutes). In some aspects the product exchange stations are outdoors or located in high traffic areas, so the lockers are rugged enough to withstand elements of the environment and are able to resist tampering. Unlike a delivery service that picks up a package at a location selected by the sender and delivers the package to an address chosen by the sender, the product exchange station is established at a location determined by the system. That is, the sender of a package (product) must go to the product exchange station to access the locker 102. Likewise, the receiver of the product must go to a system-determined product exchange station location. Unlike a post office box or safe deposit box, the locations of the product exchange stations are temporary. The product exchange station locations may be temporarily stationary for a manner of minutes or days, but more typically, the location is stationary for several hours. Since the lockers (product exchange stations) are temporary they can be set up in high traffic areas (e.g., along city streets or on sidewalks) without the requirement of a permanent address or real estate infrastructure. Thus, the locker has the advantage of being located in a convenient flexible location for a significant period of time, permitting for simplified storage and product transfer.

A locker security mechanism 106 permits a trusted agent 108 to access the locker 102. An exchange mechanism 110 has an interface 112 directing the agent 108 to a product exchange station location. More explicitly, the exchange mechanism 110 may supply the agent 108 with a locker identifier, a locker access mechanism, and the product exchange station location. Here, the interface 112 is shown as a wireless link (e.g., cellular, Wireless Local area Network (WLAN), or Wireless Personal Area Network (WPAN), but an Ethernet Internet linkage may also be used. In some aspects, the exchange mechanism 110 selects a product exchange station location in response to a request by the agent 108. For example, the agent 108 may supply their present or future location, and the exchange mechanism 110 may attempt to find a product exchange station close to the agent location. Otherwise, the exchange mechanism simply directs the agent to a particular product exchange station location. In addition to requesting product exchange site locations, an agent may request product exchange times (the times that particular stations are available), locker types, and combinations thereof. As noted above, some locker types are for the storage and transfer of digital data. Otherwise, an agent may request a large size locker for a large package or request a small locker in an effort to reduce locker usage charges.

The locker security mechanism 106 may be a simple lock-and-key, a coded keypad, or an electronic lock that is opened in cooperation with a remote site (e.g., by a secure mechanism auxiliary software application 109 stored in server memory 128). Likewise, an electronic lock may require the cooperation of a secure mechanism access auxiliary application 111 stored in locker memory 130. For example, secure mechanism auxiliary application 111 may receive a code, upon which receipt the auxiliary application directs security mechanism 106 to open.

Typically, the exchange mechanism 110 is a software application, enabled as a sequence of microprocessor instructions stored in non-transitory memory 128. However, in other aspects, the exchange mechanism 110 can be enabled as a verbal phone call, a text message exchange, or an email message exchange. Other features of a secure access mechanism are presented below in the explanation of FIG. 5.

As used herein, a "server" may be defined as a central server or controlling central management mechanism, to which a mobile locker reports. Since the central management means is likely to use computers, computer memory, software applications, and communication services, it is convenient to refer to the central management function as a server. Alternatively but not shown, the server may be a distributed network of servers, such as might be used in a peer-to-peer system. In general, communications with the server 124 may be made via a hardline (e.g., Ethernet), or transmitted continuously using WiFi, cellular telephone, or Bluetooth protocols to name a few examples. The communications are not limited to any particular type of protocol. In some aspects, the communications include both wireless and hardline protocols.

It is also typical that the locker 102 is configured for attachment to a mobile platform 114. Some examples of a mobile platform 114 include an automotive vehicle, truck, scooter, or towed trailer. In other aspects the mobile platform 114 need not have wheels, and so can be a type of portable rack carried by hand. The mobile platform provides a means of moving a locker and providing product exchange stations along city streets once the mobile platform is parked.

Figure 1B:
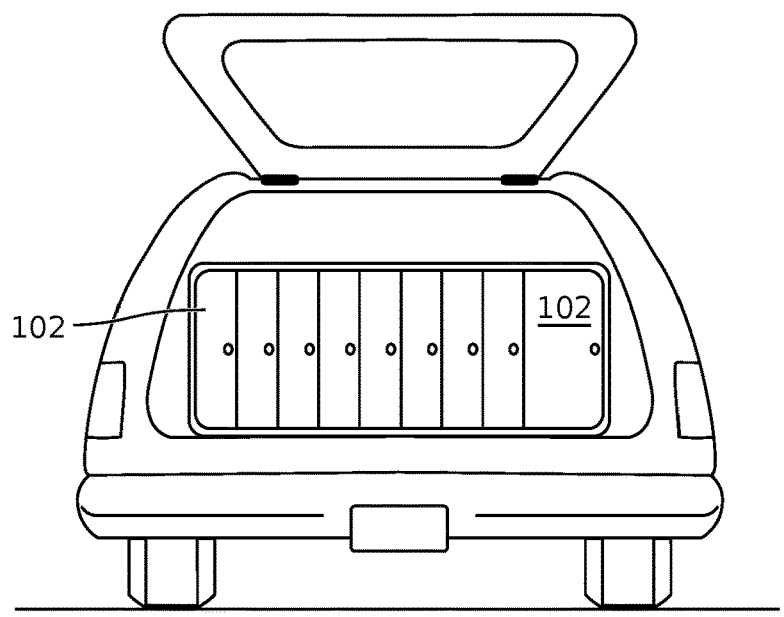
Figure 1C:
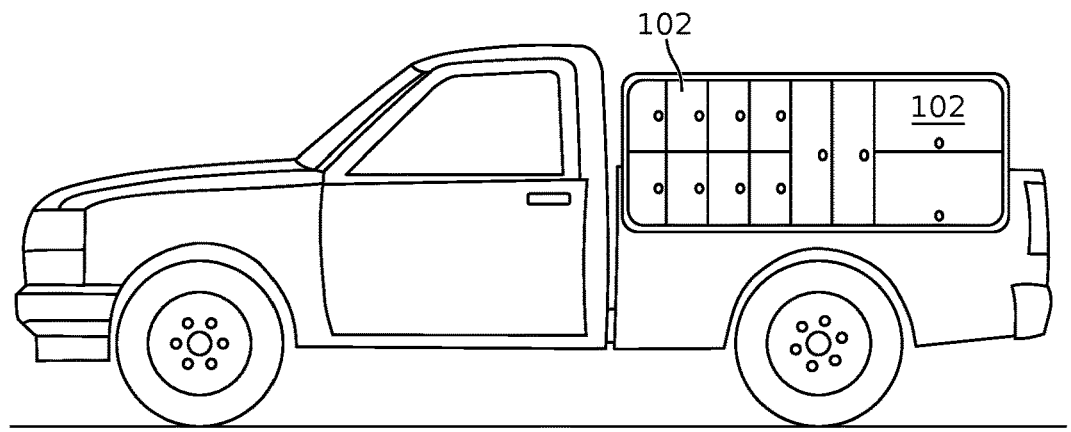
Figure 1D:
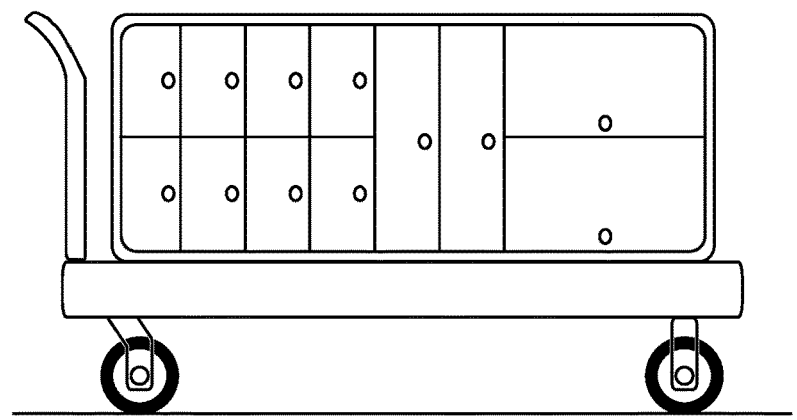

FIGS. 1B through 1D depict some exemplary locker types. The locker 102 may be a metal box with a hinged door and locking mechanism. The locker 102, or a rack of lockers as shown in FIG. 1B, may be configured for placement in the trunk of an automobile (as shown) or accessible at the rear of a hatchback type vehicle. As shown in FIG. 1C, a rack of lockers can be configured for placement in the bed of a pickup truck. In one aspect, an automotive vehicle interior space, such as the backseat or trunk, acts as the locker, and access to the locker is gained by unlocking the vehicle. In FIG. 1D, lockers 102 are arranged in a portable rack that may be set out on a sidewalk, for example, during nearby store business hours.

Returning to FIG. 1A, the system 100 may optionally comprise a location subsystem 116, configured for attachment to the locker 102, to determine the geographic location of the locker. In some aspects (not shown in this figure), the location subsystem may be embedded with the mobile platform. Examples of a location subsystem 116 include a Global Positioning Satellite (GPS) system receiver, assisted GPS taking advantage of cell tower data, a Wireless Local Area Network IEEE 802.11 (WiFi) positioning system, cell-site multilateration, satellite multilateration, inertial system, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

Another option is a communications subsystem 118 having an interface on line 120 to receive verification information including an identifier associated with the agent 108 accessing the locker 102 and an identifier associated with the locker 102. The communications subsystem 118 has an interface to antenna 122 capable of transmitting to server 124, confirmation that the locker has been successfully accessed. Otherwise, the communications subsystem 118 loads the confirmation information into local memory 130 where it can be subsequently downloaded, in non-real-time, by a hardwired or wireless means. If enabled with location subsystem 116, the communications subsystem 118 may also transmit locker location information. In one aspect, the system may use the communications system of the agent, for example, if the agent has a smartphone or personal device with cellular, WiFi, or Bluetooth capabilities. The communications subsystem 118 may be configured for attachment to the locker 102 or a mobile platform associated with the locker.

Yet another option is a camera 144 that may work in cooperation with the security mechanism 106 and/or location subsystem 116. Otherwise, the camera may just provide images of the proximate environment, which may be used to determine locker access, agent identity, and location.

Figure 2A:
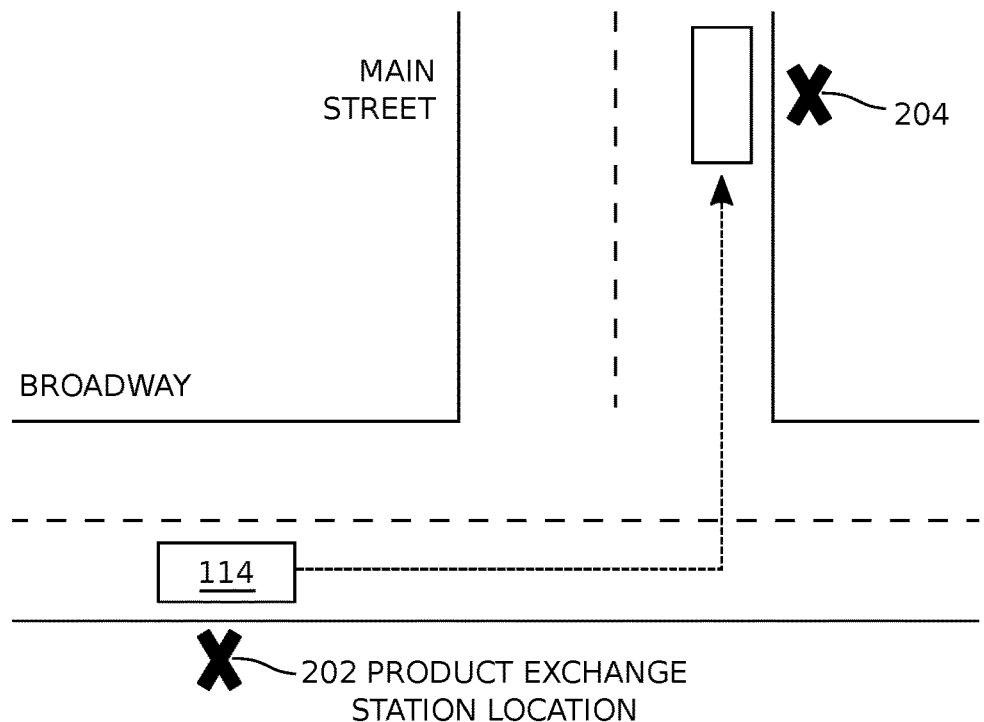
FIGS. 2A through 2C are diagrams depicting some exemplary product exchange station locations.
Figure 2B:
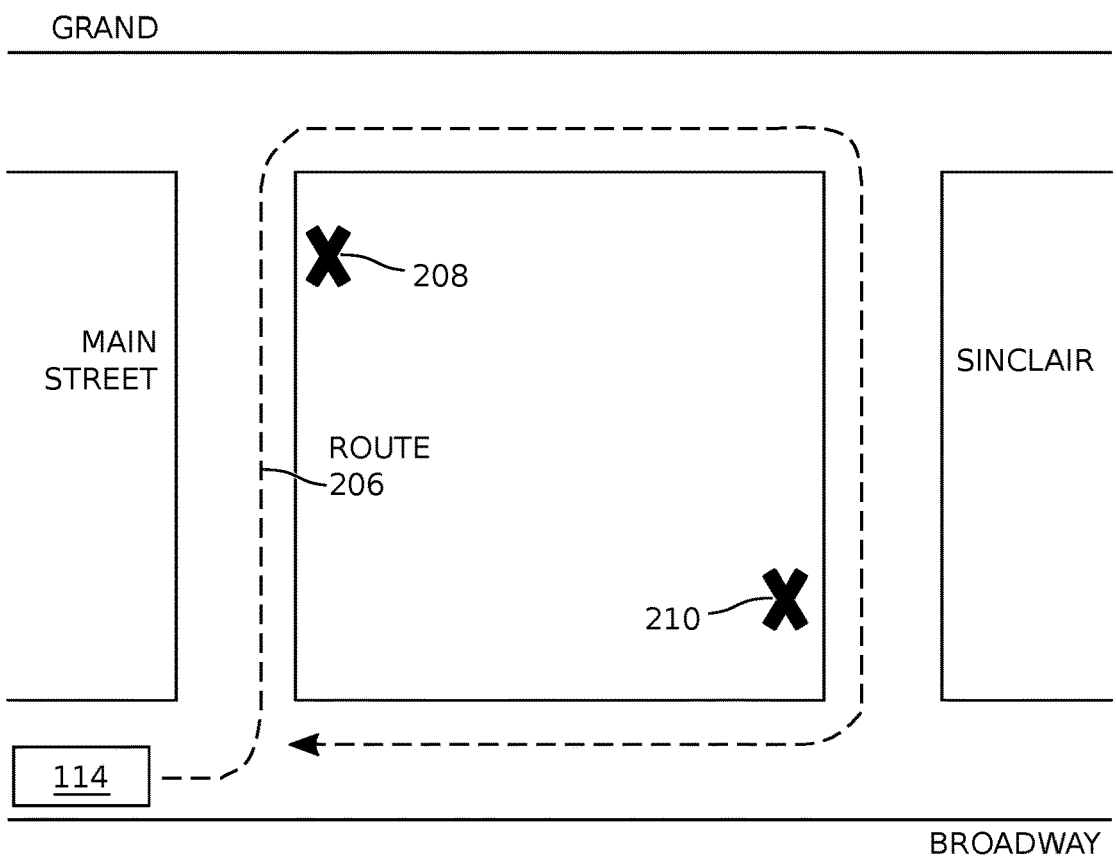
Figure 2C:
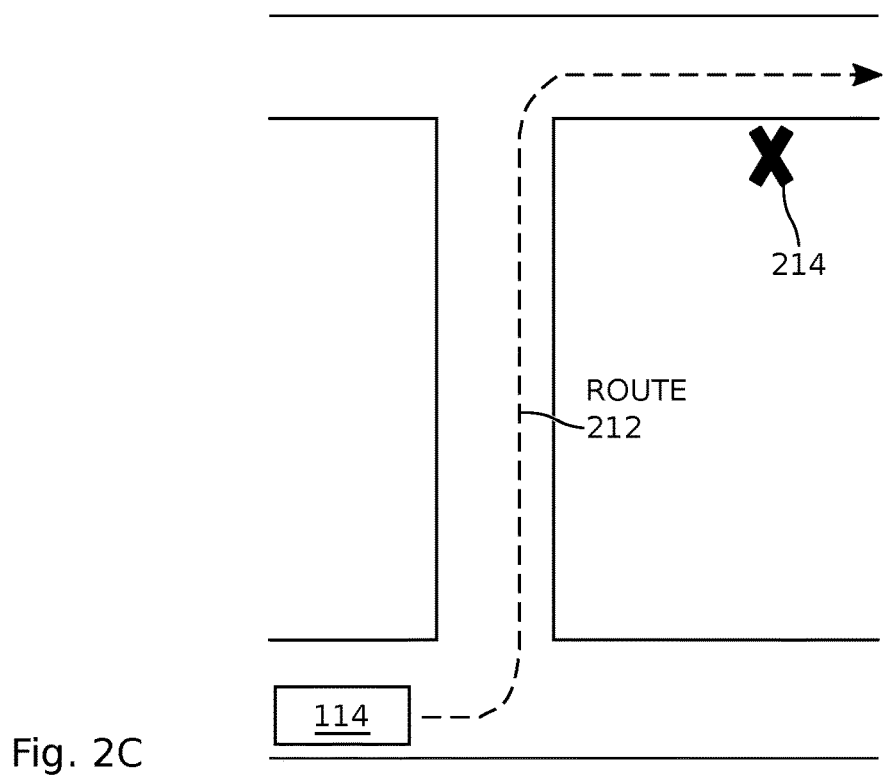

FIGS. 2A through 2C are diagrams depicting some exemplary product exchange station locations. FIG. 2A depicts a mobile platform 114 parked at a first product exchange station location 202 on Broadway, where a product is loaded into a mobile locker. Subsequently, the mobile platform 114 is parked at a second product exchange station location 204 on Main Street, where the product is removed from the locker.

FIG. 2B depicts a product exchange station location that is a mobile platform route 206. Here, the mobile platform 114 follows a route along Broadway, to Main Street, to Grand, and to Sinclair, returning to Broadway. In this example, the route 206 is predetermined route. Optionally, there may be predetermined exchange station locations 208 and 210 along the predetermined route 206. Further, the station locations may have predetermined stopping times and durations. In other aspects, non-predetermined product exchange station locations can be established along the route.

FIG. 2C depicts a product exchange station location that is a non-predetermined route 212. Here, the mobile platform 114 enters Broadways, turns on Main Street, and exits on Grand. In this case, an exchange station stop 214 may be arranged on-the-fly along the unscheduled route 212.

Figure 3A:
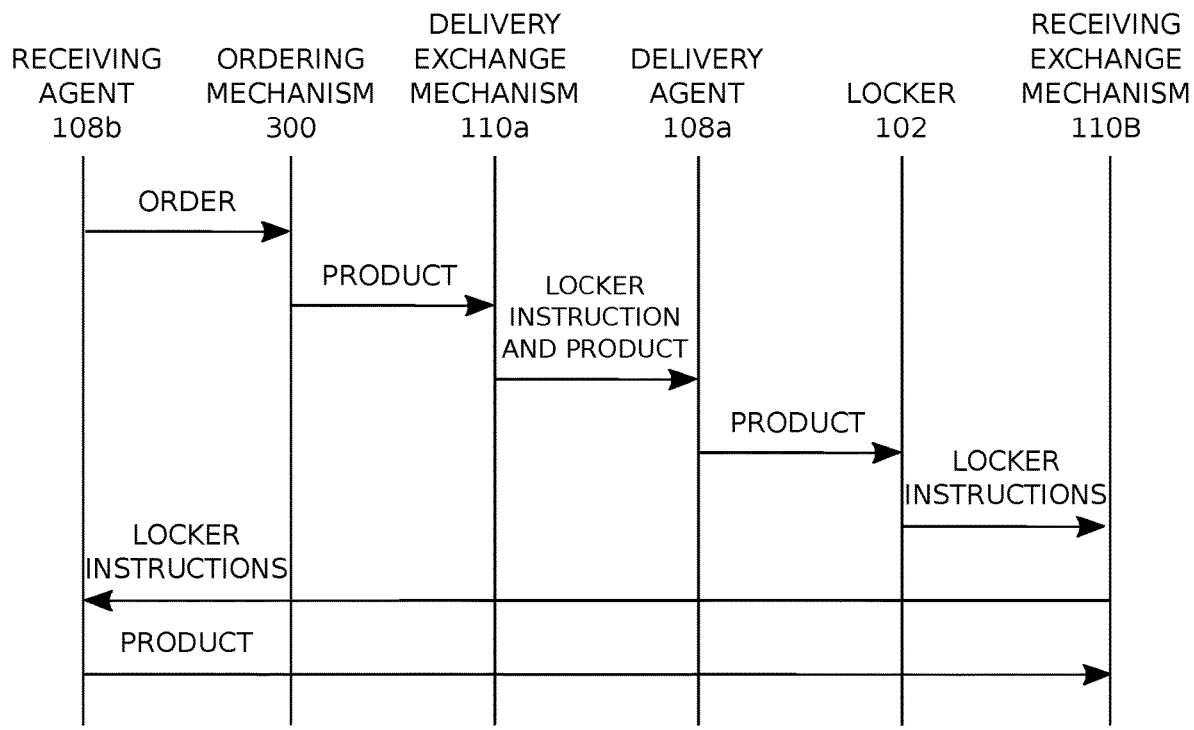
FIGS. 3A and 3B are charts depicting the exemplary flow of a product through mobile lockers.
Figure 3B:
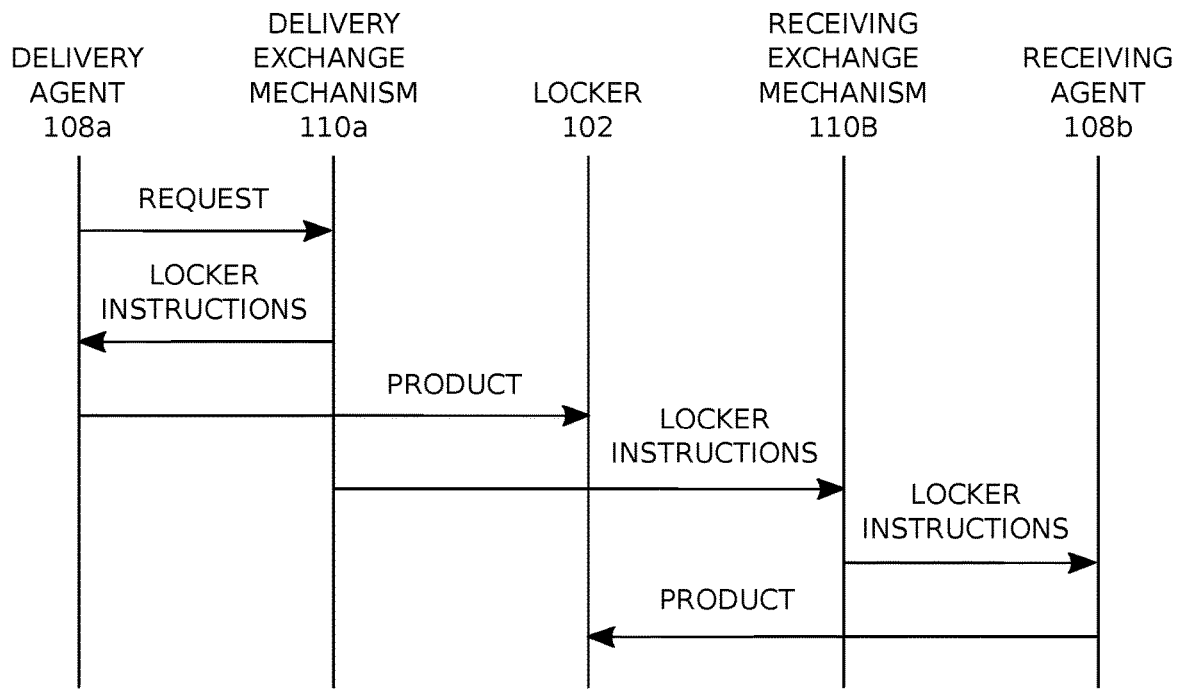

FIGS. 3A and 3B are charts depicting the exemplary flow of a product through mobile lockers. The trusted agent (108, see FIG. 1A) may be a delivery agent 108a inserting the product 104 into the locker 102 or a receiving agent 108b removing the product from the locker. In FIG. 3A an ordering mechanism 300 accepts requests for product orders from a receiving agent 108c, and supplies the ordered product to a delivery exchange mechanism 110a. Typically, the ordering mechanism 300 is a software application enabled as a sequence of processor instructions, stored in a server memory. Otherwise, the ordering mechanism 300 can be enabled as a verbal phone call, a text message, or an email. The delivery exchange mechanism 110a sends the product and locker instructions (i.e., locker identifier, a locker access mechanism, and a product delivery station location) to delivery agent 108a, who inserts the product into locker 102 and provides the locker instructions to the receiving exchange mechanism 110b. The receiving exchange mechanism provides the locker instructions to the receiving agent 108b, who is then able to retrieve the product from the locker. Note: the receiving exchange mechanism may move the product from the location initially provided by the delivery exchange mechanism, to a different locker, a different product exchange station location, or both.

In FIG. 3B a delivery agent 108a sends a request for a locker, and may additionally request a desired product exchange station location (e.g., close to the delivery agent location). A delivery exchange mechanism 110a sends locker instructions (locker identifier, a locker access mechanism, and a product delivery station location) to the delivery agent 108a, who is able to then insert a product into locker 102. Once the locker is loaded, the delivery exchange mechanism 110a sends locker instructions to a receiving exchange mechanism 110b, which are forwarded to receiving agent 108b, who is then able to retrieve the product from the locker. Note: the receiving exchange mechanism 110a may move the product from the one loaded by the delivery agent 108a, to a different locker and/or different product exchange station location. In some aspects, the delivery exchange mechanism and receiving exchange mechanism are the same. Further, if the locker is simply being used for temporary storage, the delivery agent and receiving agent may be the same entity.

Figure 4A:
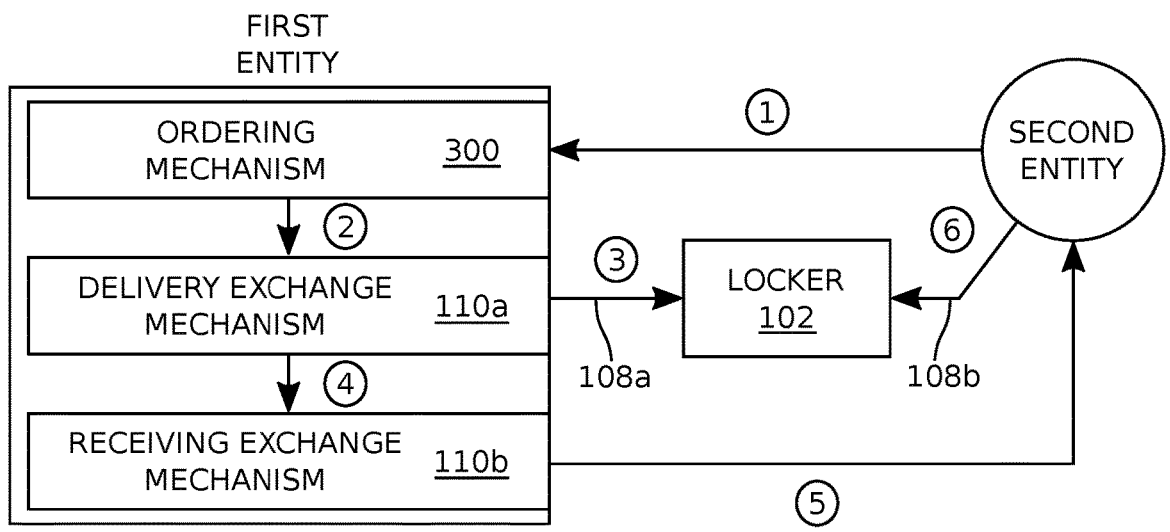
FIGS. 4A through 4C depict examples of how the mobile locker functions may be shared between different entities.
Figure 4B:
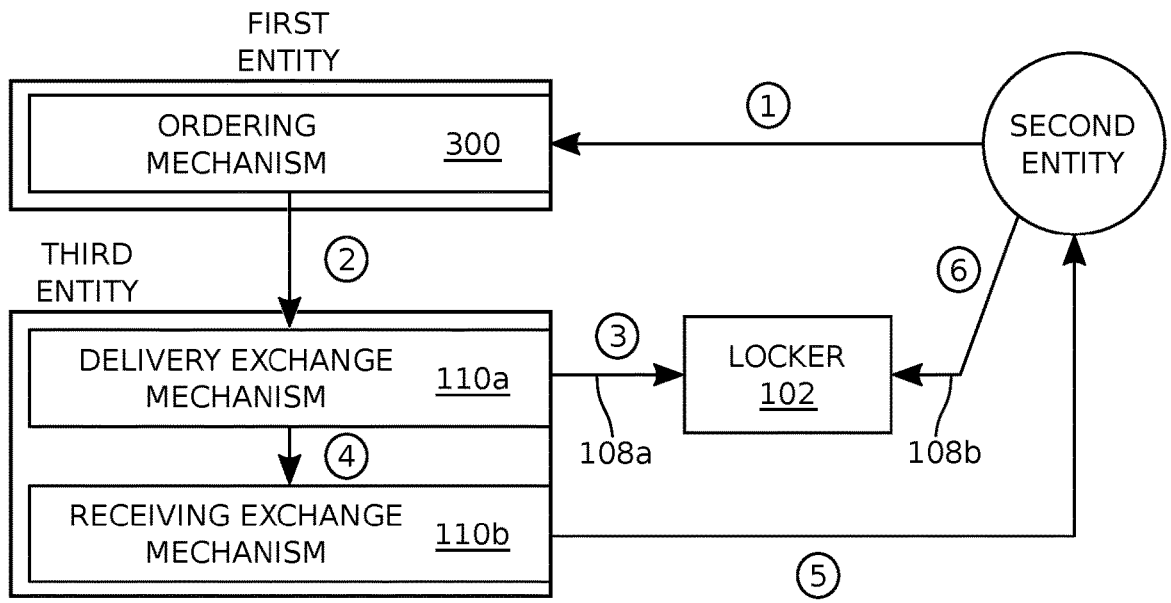
Figure 4C:
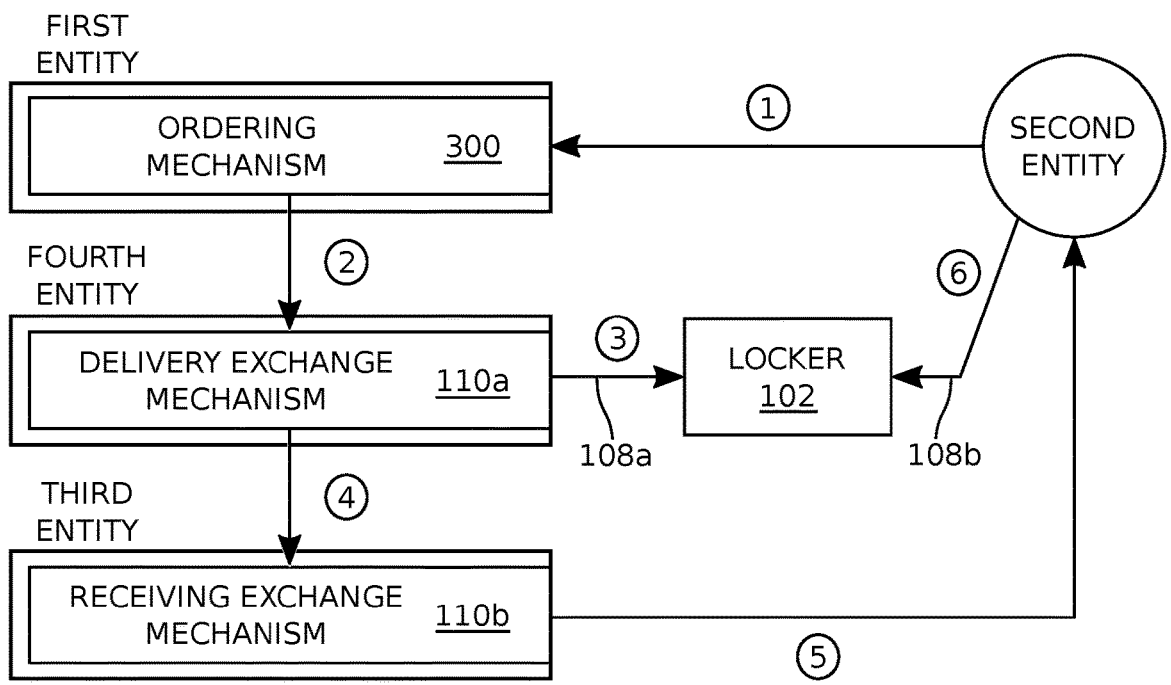

FIGS. 4A through 4C depict examples of how the mobile locker functions may be shared between different entities. In FIG. 4A the ordering mechanism 300 is associated with a first entity, and it receives a product order from a second entity in Step 1, who is, ultimately, the receiving agent. As noted above, the ordering mechanism 300 is typically a software application stored in the memory of a server. As used herein, an entity is a person, business, corporation, or social organization. In this example, the first entity may be an online distributor and the second entity a customer. In Step 2 a delivery exchange mechanism 110a, associated with the first entity, receives the product and in Step 3 supplies a delivery agent 108a with the product, a locker identifier, a locker access mechanism, and a product delivery station location, so that the locker can be loaded with the product. In Step 4 a receiving exchange mechanism 110b, associated with the first entity receives the locker information and in Step 5 it supplies the locker information, including a locker identifier, a locker access mechanism, and a product receiving station location, to a receiving agent 108b associated with the second entity. In Step 6 the receiving agent 108b is able to retrieve the product from the locker. The delivery exchange mechanism 110a and receiving exchange mechanism 110b may also be software applications stored in a server memory. Although not shown, the product exchange station location and locker used by the delivery exchange mechanism 110a may not necessarily be the product exchange station location and locker used by the receiving exchange mechanism 110b.

As an alternative, the ordering mechanism 300, delivery exchange mechanism 110a, and receiving exchange mechanism 110b may all be associated with a locker management business that acts as an intermediary between the second entity customer and the first entity online distributor.

In FIG. 4B the ordering mechanism 300 is again associated with a first entity, and it receives a product order from a second entity in Step 1. In Step 2 a delivery exchange mechanism 110a, associated with a third entity, receives the product and in Step 3 supplies a delivery agent 108a with the product, a locker identifier, a locker access mechanism, and a product delivery station location, so that the locker can be loaded with the product. For example, the third entity may be a locker management business. In Step 4 a receiving exchange mechanism 110b, associated with the third entity, receives the locker information and in Step 5 it supplies the locker information, including a locker identifier, a locker access mechanism, and a product receiving station location, to a receiving agent 108b associated with the second entity. In Step 6 the receiving agent 108b is able to retrieve the product from the locker. Again, the product exchange station location and locker used by the delivery exchange mechanism 110a may not necessarily be the product exchange station location and locker used by the receiving exchange mechanism 110b.

In FIG. 4C the ordering mechanism 300 is again associated with a first entity, and it receives a product order from a second entity in Step 1. In Step 2 a delivery exchange mechanism 110a, associated with a fourth entity, receives the product, and in Step 3 supplies a delivery agent 108a with the product, a locker identifier, a locker access mechanism, and a product delivery station location, so that the locker can be loaded with the product. For example, the fourth entity may be a delivery business. In Step 4 a receiving exchange mechanism 110b, associated with the third entity, receives the locker information. In Step 5 the receiving exchange mechanism supplies the locker information to a receiving agent 108b, associated with the second entity, including a locker identifier, a locker access mechanism, and a product receiving station location. In Step 6 the receiving agent 108b is able to retrieve the product from the locker. Again, the product exchange station location and locker used by the delivery exchange mechanism 110a may not necessarily be the product exchange station location and locker used by the receiving exchange mechanism 110b.

Returning to FIG. 1A, the system 100 may further comprise a gig mobile platform mechanism 130 accepting an offer from a platform agent to supply a first mobile platform, having an attached locker, as a mobile locker platform. Alternatively stated, an entity or agent associated with a mobile platform (e.g., the platform owner) offers the temporary use of their platform to the gig mobile platform mechanism. These communications may be conducted through a platform agent portal, shown connected to the communications system on line 133. Then, the exchange mechanism 110 is able to establish a product exchange station location for the first mobile platform if the offer is accepted. As shown, the gig mobile platform mechanism 132 is a software application stored in memory 128, enabling a sequence of processor instructions permitting the receipt and acceptance of mobile platform offers. This feature allows owners to offer their vehicles as lockers or locker platform when the vehicles are not otherwise in use. It should be understood that in combination with a gig parking mechanism (explained below) the platform may be moved to multiple product exchange station locations.

The exchange mechanism 110, in accepting the offer, may supply a plurality of potential product exchange station locations. These product exchange station location may have corresponding weighted values, and rewards may be provided corresponding to the value of the product exchange station location. The rewards may be assigned to the entity associated with the platform, the entity associated with the gig mobile platform mechanism 130, the entity associated with the exchange mechanism 100, or a combination of these entities. The reward may be responsive to factors such as the platform starting location, platform destination location, distance between starting and destination parking locations, travel time between starting and destination parking locations, time of day, day of the week, locker size, product value, and combinations thereof.

The most obvious type of reward is money. However, the entities may alternatively be rewarded with bitcoin, cryptocurrency, coupons, social recognition, or services. For example, the location may be weighted in response to geographic location factors such as proximate vehicular traffic, line of sight from a particular vantage point, proximate pedestrian traffic, proximity to cultural events, proximity to cultural facilities, and combinations thereof. A cultural event is generally understood to be an activity involving human beings. Likewise, a cultural facility is a facility used by human beings, such as a museum, office building, or grocery store parking lot. As a more explicit example, a product exchange station location may have a first value if positioned within X feet of a particular target location, and second value, greater than the first value, if positioned within X/2 feet of the same location.

There may be locations, such as parks, hospitals, or freeways where signage or parking is legally restricted, and in one aspect these locations are given a target value of zero. In one aspect, the system may even prevent the parking in legally restricted areas. The system described herein is not limited to any particular factors weighting a target location.

As is common in many computer systems, a processor 134 is connected to the bus line 120, to pull operating instructions from operating system (OS) 136 and software applications in memory 130, and manage communications between the various components of system 100. Likewise, server 124 would be enabled through the use of processor 138, OS 140, software applications, communications system 142, and antenna 143, which may include an Internet link (not shown). For ease of understanding, the above-described functions have been described as individual components. However, it should be understood that in practice, multiple functions may be performed by a single device, subsystem, or software application.

Figure 5:
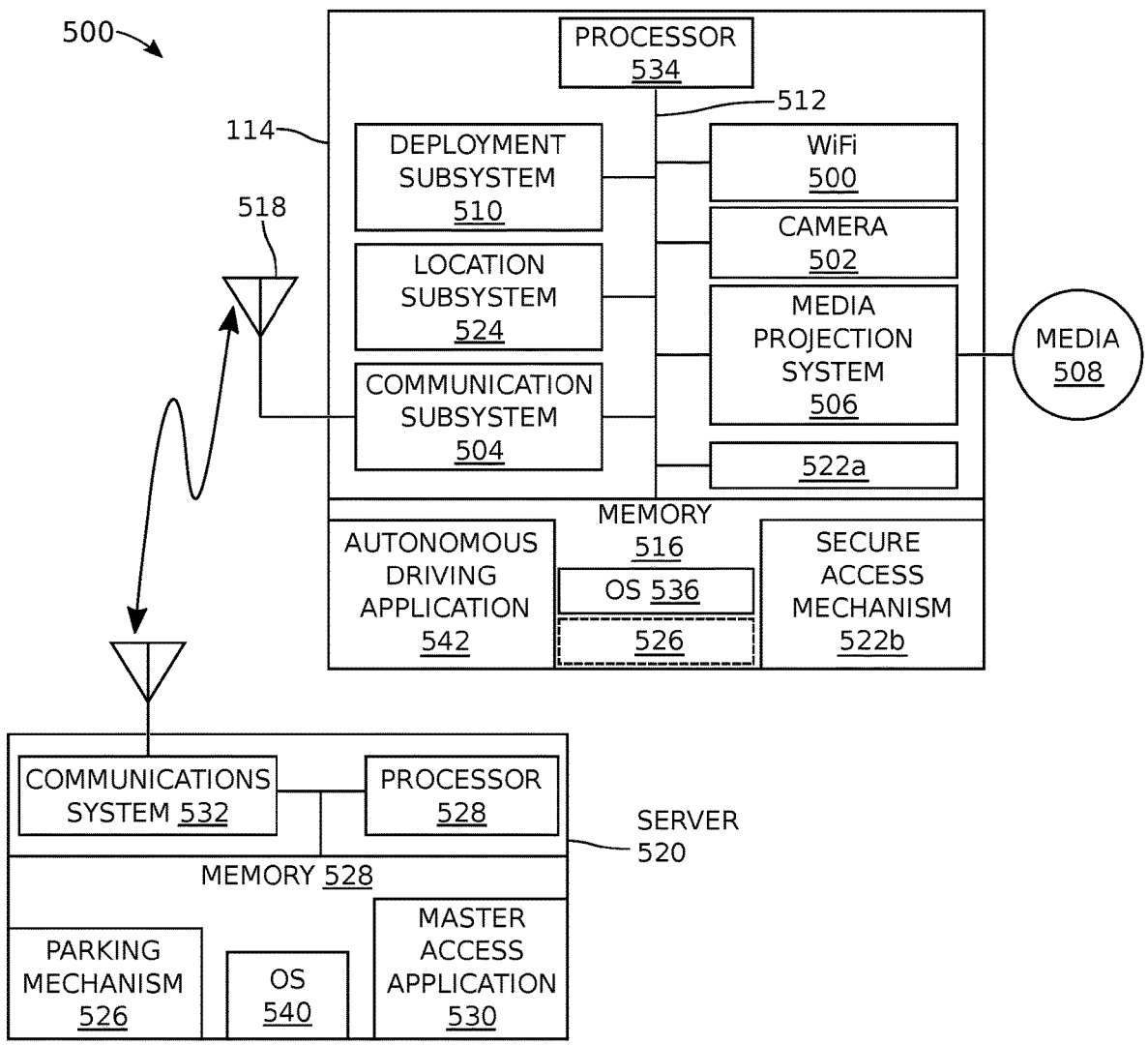
FIG. 5 is a schematic block diagram depicting optional features that may be enabled with the mobile platform of FIG. 1A

FIG. 5 is a schematic block diagram depicting optional features that may be enabled with the mobile platform of FIG. 1A. In the interest of clarity, some shared elements have been separately presented in the explanations of FIGS. 1A and 5. However, it should be understood that a system may incorporate elements presented in the explanation of both figures. In one aspect, the mobile platform 114 (or alternatively the locker 102 of FIG. 1A) may comprise a publically accessible Wireless Local Area Network (WLAN) IEEE 802.11 (WiFi) hotspot (access point (AP)) 500 that is configured for attachment to the mobile platform 114 or locker 102. WiFi is a likely AP choice since most user smartphone or personal communication devices are WiFi equipped. Alternatively, but less common, the access point 500 may be a Wireless Personal Area Network (WPAN) IEEE 802.15, examples of which include Li-Fi, wireless USB, and Bluetooth. Even more unlikely as an access point are Long Range Wireless systems. In the case of the WiFi hotspot being the communications subsystem, elements 500 and 504 would be collocated. Otherwise, the WiFi hotspot 500 is connected to the communications subsystem 504 through line 512. Alternatively, the communication subsystem used may be the ones previously described in the explanation of FIG. 1A (see 118). In some cases, the deployment subsystem 510 supplies the enablement signal in response to the WiFi hotspot being enabled.

Another option is a camera 502 that is configured for attachment to the mobile platform 114, having an output to supply images of a proximate geographic location to the mobile platform. In this aspect, the communications subsystem 504 transmits the camera images to a server, or stores the images in a local memory.

A further option is a media projection subsystem 506 that may be selectively enabled, configured for attachment to the mobile platform 114 and having an interface to project media 508. Some examples of the media projection subsystem 506 and media interface 508 include a screen over an exterior surface of the platform, including a lighted screen, a screen covering an interior (or exterior) window surface, a projector image appearing on a window or exterior surface of the platform, a projector image relayed through a vehicle rear view or side mirror, a projector image illuminated a portion (e.g. a vertical side) of a mobile platform, a sign formed on a portion (e.g., a vertical side) of a mobile platform, a mobile platform cover, any of the above-mentioned screens enabled with a field of light emitting diodes (LEDs), or a holographic display. In other words, the media interface may be a 2-dimensional or 3-dimensional image, which may or may not be active (change images). The media interface 110 may also broadcast sounds as an alternative, or in addition, to the displayed image. In the case of a display screen, the screen may be deployed, from the roof or top of the platform 102, over the sides, front, top, or back of the platform. In the case of a holographic display, the image may be presented on top of, or over the platform 102 or alongside of the platform. Projector images may also be displayed as images near the platform, including sidewalks and buildings, or a screen deployed over a surface of the mobile platform. The system is not limited to any particular type of display.

In one aspect, a deployment subsystem 510 is configured for attachment to the mobile platform 114, having an interface on line 512 to receive an enablement signal in response to the media projection subsystem being enabled. The communications subsystem 504 receives verification information on line 512 including the enablement signal, and either transmits the verification information to a server 520 via antenna 514, or records the information in local memory 516. In one aspect, the media projection subsystem 506 is enabled only when the mobile platform is stationary.

In one aspect, the system enables gig parking. Gig parking is one means of moving the product exchange station locations. A secure mobile platform access mechanism is configured for attachment to the mobile platform 114, permitting a trusted parking agent to gain control over the mobile platform. The location subsystem 524 determines the geographic location of the mobile platform 114. Alternatively, the location subsystem associated with the mobile locker and described in FIG. 1A may be used (see 116). The location subsystem 524 may be used to determine stationary locations or location while moving. The communications subsystem 504 receives verification information on line 512 including an identification code associated with the parking agent, an identification code associated with the mobile platform, and the geographic location, and has an interface to transmit the verification information via antenna 518. A gig parking mechanism 526 supplies a destination product exchange station location to the parking agent.

As presented in parent application Ser. No. 17/071,043, some simple examples of a parking mechanism 526 include a verbal telephone conversation, text message, or email, where the parking agent receives parking destination instructions. Alternatively as shown, the parking mechanism 526 is a software application stored in a non-transitory memory 528 or server 520, enabling a sequence of processor executable instructions for supplying a destination parking location. In one aspect, the parking agent is directed to one particular destination parking location. However, it should be understood that based upon local conditions and traffic, the parking agent may be required to park in a different, but close-by, location. In this case the parking mechanism 526 may be able to supply alternative locations, or supply limits as to how far the actual destination may vary from the assigned destination. In some aspects, the parking agent is able to choose from a list of mobile platforms with corresponding destination parking locations, starting parking locations, and timing restraints, and the parking application 526 accepts the parking agent's selection. For example, some product exchange station locations may be more desirable than others. As explained below, it should be understood that the parking agent may be able to choose from a plurality of mobile platforms that may have common or different parking location requirements. Optionally, the parking mechanism 526, as indicated in phantom, may be embedded in platform memory 516, in which case the parking agent may be able to communicate with the parking mechanism via the communications subsystem 504 or WiFi hotspot 500.

The secure access mechanism 522a may be a mechanical or partially mechanical component such as a traditional lock-and-key mechanism, keypad, or a wireless key fob. Otherwise, the secure access mechanism 522b may be at least partially enabled as an access software application embedded in platform memory 516 and/or platform memory 516, enabled as a sequence of processor executable steps for unlocking the platform and permitting the platform to be started, moved, and locked upon reaching the destination. For example, the secure access mechanism may include a hardware component keypad to accept an access code that is verified by the software component of the secure access mechanism. Otherwise, a parking agent may use a smartphone to request an access code from a master access software application 530, embedded in server memory 528, comprising a sequence of processor executable steps for verifying parking agents and matching parking agents to platforms. Otherwise, the master access application 530 may send a message to the secure access mechanism 522b, via communications subsystem 504 and through communications system 532, to unlock the car and permit parking agent control of the platform 114, following parking agent verification. The parking agent may be a human being or an autonomous driving software application stored in non-transitory memory 516 enabling a sequence of processor executable steps for driving an automotive vehicle mobile platform.

The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the systems described herein may include both a volatile memory unit and a non-volatile storage device. The memory may be implemented as shared memory and/or distributed memory in a network device.

A processor 534 is connected to the bus line 512, to pull operating instructions from OS 536 and software applications in memory 516, and to manage communications between the various components of the system. Likewise, server 520 would be enabled through the use of processor 538, OS 540, embedded software applications, and communications system 532, which may include an Internet link and Ethernet linkage (not shown). For ease of understanding, the above-described functions have been described as individual components. However, it should be understood that in practice, multiple functions may be performed by a single device, subsystem, or software application.

Figure 6:
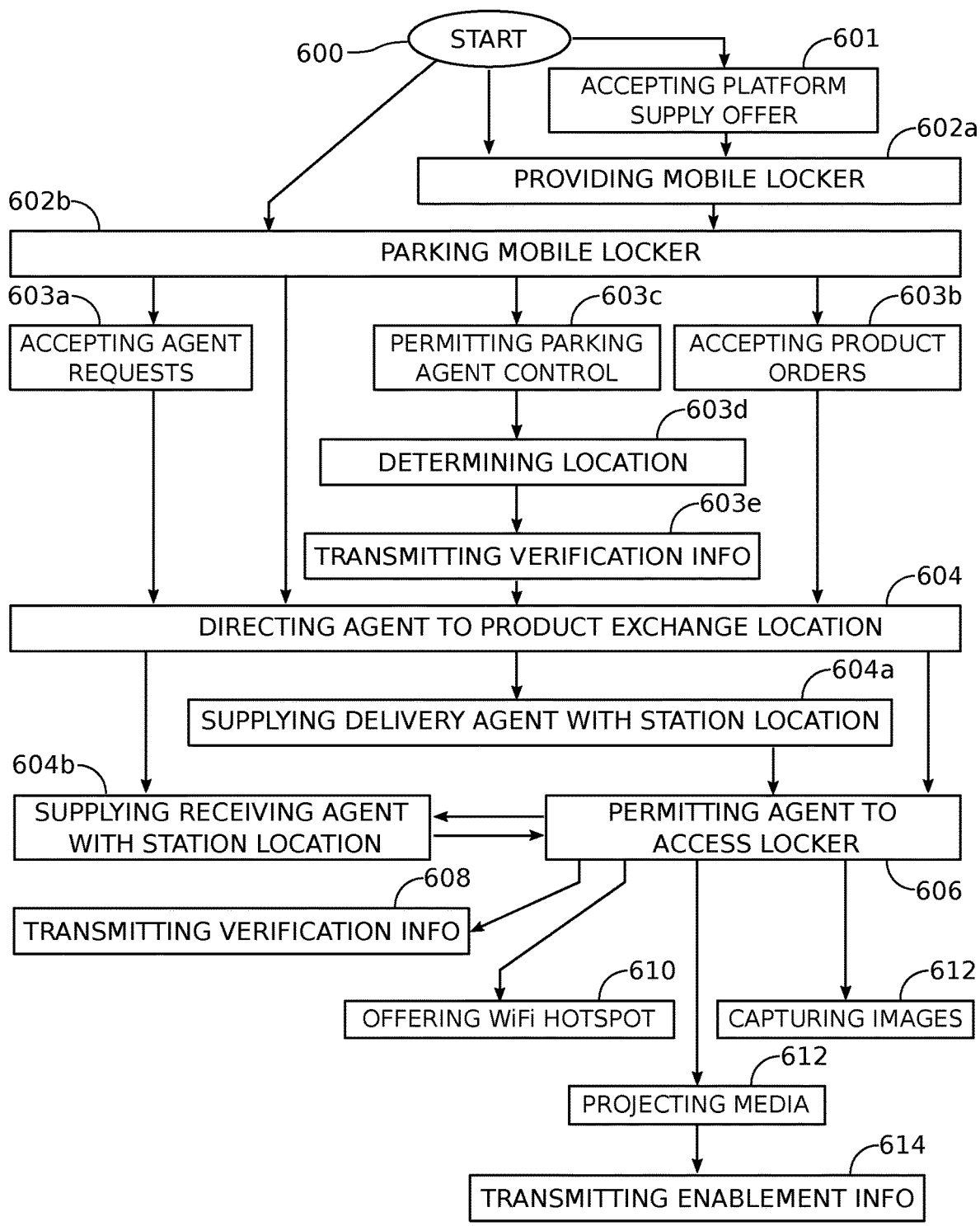
FIG. 6 is a flowchart illustrating a mobile delivery method.

FIG. 6 is a flowchart illustrating a mobile delivery and storage method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 600.

Step 602 provides a mobile locker capable of holding a product. In one aspect, Step 602a provides a locker configured for attachment to a mobile platform. Step 602b parks the mobile locker at a temporary product exchange station. In one aspect, Step 603a accepts product exchange station location requests, product exchange station time requests, locker size requests, or combinations thereof, from an agent. Step 604 directs the agent to a product exchange station location, typically with a locker identifier and locker access mechanism. Step 606 permits a trusted agent to access the locker cavity. More explicitly, the trusted agent can be a delivery agent inserting the product into the locker or a receiving agent removing the product from the locker. In one aspect, permitting the agent access in Step 606 includes the locker receiving verification information including an identifier associated with the agent accessing the locker and an identifier associated with the locker, and the locker transmitting the fact that the locker has been accessed. Step 608 transmits verification information to a server. The verification information may include an identifier associated with the agent accessing the locker, an identifier associated with the locker, and the geographic location of the locker.

In one aspect, directing the agent to the product exchange station location includes directing the agent to a product exchange station location that is a mobile platform (moving) route. The mobile platform route may be a route with predetermined or non-predetermined product exchange station locations, as well as times and durations corresponding to stations along the route, and combinations thereof.

In one aspect Step 603b includes a first entity accepting product orders from a second entity. Directing the agent to the product exchange station in step 604 includes the following substeps. In Step 604a a delivery exchange mechanism, associated with the first entity, supplies a delivery agent with a locker identifier, a locker access mechanism, and a product delivery station location. If there is no product already in the locker, the locker access mechanism may not be enabled (i.e., the locker is open). In Step 604b a receiving exchange mechanism, associated with the first entity, supplies a receiving agent with a locker identifier, a locker access mechanism, and a product receiving station location. For example, the first entity can be an online distributor of products and the second entity can be a customer. Alternatively, the locker management company may perform the above-described steps, and act as an intermediary between the second entity customer and the online distributor.

In a first variation, the first entity again accepts the product order, but the delivery and receiving exchange mechanisms are associated with the third entity. In a second variation, the first entity again accepts the product order, but the delivery exchange mechanism is a fourth entity, and receiving exchange mechanism is associated with the third entity. For example, the fourth entity may be a delivery company.

In one aspect, in Step 601 a gig mobile platform mechanism accepts an offer from a platform agent to supply a first mobile platform as a mobile locker. Then, Step 604, directing the agent to the product exchange station location, includes establishing a product exchange station location for the first mobile platform in response to the offer. Step 604 may supply a plurality of potential product exchange station location options, or direct the platform agent or parking agent to one particular location. The product exchange station locations may have corresponding weighted value, with rewards corresponding to the value of the product exchange site locations. The reward may be responsive to factors such as the platform starting location, platform destination location, distance between starting and destination parking locations, travel time between starting and destination parking locations, time of day, day of the week, locker size, product value, and combinations thereof.

In one aspect, Step 610 offers public access to a Wireless Local Area Network (WLAN) IEEE 802.11 (WiFi) hotspot configured for attachment to the mobile platform. In another aspect, Step 612 captures images of a proximate geographic location to the mobile platform, which can be recorded in local memory or transmitted to a server. In yet another aspect, Step 614 projects media from a selectively enabled media projection subsystem, configured for attachment to the mobile platform, and Step 616 may transmit an enablement signal to a server verifying that the media projection subsystem is enabled.

Optionally, Step 603c permits a trusted parking agent to gain control over the mobile platform. Step 603d determines a geographic location of the mobile platform. Step 603e transmits verification information to a server, including an identification code associated with the parking agent, an identification code associated with the mobile platform, and the geographic location. Then in Step 604 the exchange mechanism supplies the parking agent with a destination product exchange station location, and the parking agent delivers the mobile platform to the accepted product exchange station location. The parking agent is either a human being or an autonomous driving software application 542 stored in a non-transitory memory enabling a sequence of processor executable steps for driving an automotive vehicle mobile platform.

In one aspect Step 603a accepts a product destination from a trusted delivery agent. Step 604a supplies a delivery agent with a locker identifier, a locker access mechanism, and a product delivery exchange station location. In Step 606 the delivery agent inserts the product into the locker at a product delivery station location. Then, Step 604b supplies a receiving agent with a locker identifier, a locker access mechanism, and a product receiving exchange station location, and the product is removed in Step 606.

Systems and methods have been provided for a mobile locker service, with the optional deployment of WiFi hotspots and media projection systems. Examples of particular message structures, schematic block linkages, and hardware units have been presented to illustrate the invention. However, the invention is not limited to merely these examples. Other variations and embodiments of the invention will occur to those skilled in the art.

We claim:

1. A mobile locker system comprising:
   a mobile locker capable of holding a product, configured for attachment to a mobile platform parked at a temporary product exchange station location having a weighted value;
   a locker security mechanism permitting a package agent to access the locker;
   a location subsystem to determine the geographic location of the mobile platform;
   an exchange mechanism having an interface directing the package agent to the product exchange station location:
   a gig mobile platform mechanism accepting an offer from a platform agent to supply the mobile platform with the attached mobile locker;
   wherein the exchange mechanism establishes the product exchange station location for the mobile platform in response to the offer;
   a gig parking mechanism supplying the product exchange station location to a parking agent selected from the group consisting of a human being and an autonomous driving software application stored in a non-transitory memory enabling a sequence of processor executable steps for driving an automotive vehicle mobile platform;
   a secure mobile platform access mechanism permitting the parking agent to gain control over the mobile platform;
   a communications subsystem having an interface to receive verification information including an identification code associated with the parking agent, an identification code associated with the mobile platform, and geographic location, and an interface to transmit the verification information; and,
   wherein an entity associated with the mobile platform receives a reward corresponding to the value of the product exchange station location.

2. The system of claim 1 wherein the communications subsystem has an interface to receive verification information including an identifier associated with the package agent accessing the locker and an identifier associated with the locker, and an interface to transmit the access of the locker.

3. The system of claim 1 wherein the package agent is selected from the group consisting of a delivery agent inserting the product into the locker, or a receiving agent removing the product from the locker.

4. The system of claim 1 wherein the exchange mechanism has an agent interface to supply an agent with a locker identifier, a locker access mechanism, and the product exchange station location.

5. The system of claim 1 wherein the exchange mechanism comprises:
   a deliver exchange mechanism;
   a receiving exchange mechanism;
   the system further comprising:
   an ordering mechanism having an interface accepting a product order from a receiving agent, and an interface to supply the ordered product to a delivery exchange mechanism.

6. The system of claim 5 wherein the ordering mechanism, associated with a first entity, receives a product order from a second entity;
   wherein a delivery exchange mechanism, associated with the first entity, has an interface to supply a delivery agent with the product, a locker identifier, a locker access mechanism, and a product delivery exchange station location; and,
   wherein a receiving exchange mechanism, associated with the first entity, has an interface supplying a receiving agent, associated with the second entity, a locker identifier, a locker access mechanism, and a product receiving exchange station location.

7. The system of claim 5 wherein the ordering mechanism, associated with a first entity, receives a product order from a second entity;

wherein a delivery exchange mechanism, associated with a third entity, has an interface to supply a delivery agent with the product, a locker identifier, a locker access mechanism, and a product delivery exchange station location; and, wherein a receiving exchange mechanism, associated with the third entity, has an interface supplying a receiving agent associated with the second entity, a locker identifier, a locker access mechanism, and a product receiving exchange station location.

8. The system of claim 5 wherein the ordering mechanism, associated with a first entity, receives a product order from a second entity;

wherein a delivery exchange mechanism, associated with a fourth entity, has an interface to supply a delivery agent with the product, a locker identifier, a locker access mechanism, and a product delivery exchange station location; and, wherein a receiving exchange mechanism, associated with a third entity, has an interface supplying the receiving agent associated with the second entity, a locker identifier, a locker access mechanism, and a product receiving exchange station location.

9. The system of claim 1 wherein the exchange mechanism selects the product exchange station location in response to agent requests selected from the group consisting of product exchange station locations, product exchange times, destination, locker types, and combinations thereof.

10. The system of claim 1 wherein the exchange mechanism establishes a product exchange station location along a mobile platform route selected from the group consisting of a route with predetermined product exchange station locations, non-predetermined product exchange station locations, and combinations thereof.

11. The system of claim 1 further comprising:
a camera having an output to supply images of a geographic location proximate to the locker.

12. The system of claim 1 wherein the exchange mechanism comprises a delivery exchange mechanism having an interface to accept a product destination request from a delivery agent, and an interface supplying the delivery agent with a locker identifier, a locker access mechanism, and a product delivery exchange station location;

wherein the delivery agent inserts the product into the locker at a product delivery exchange station location; and, wherein a receiving agent removes the product from the locker at a product receiving exchange station location.

13. The system of claim 1 wherein the exchange mechanism has an interface to supply a plurality of potential product exchange station locations.

14. The system of claim 1 wherein the entity receives a reward responsive to factors selected from the group consisting of platform starting location, platform destination location, distance between starting and destination parking locations, travel time between starting and destination parking locations, time of day, day of the week, locker size, product value, and combinations thereof.

15. The system of claim 1 further comprising:
a publically accessible Wireless Local Area Network (WLAN) IEEE 802.11 (WiFi) hotspot.

16. The system of claim 1 further comprising: a selectively enabled media projection subsystem, configured for attachment to the mobile platform, having an interface to project media.

17. The system of claim 16 wherein the communications subsystem has an interface to transmit an enablement signal to a server in response to the media projection subsystem being enabled.

18. A mobile delivery and storage method comprising:
providing a mobile locker capable of holding a product and configured for attachment to a mobile platform;
parking the locker at a temporary product exchange station location with a weighted value;
directing a package agent to the geographic location of product exchange station location;
permitting the package agent access to the locker;
a gig mobile platform mechanism accepting an offer from a platform agent to supply the mobile platform with the attached mobile locker;
wherein directing the package agent to the product exchange station location includes establishing a product exchange station location for the mobile platform in response to the offer;
permitting a parking agent to gain control over the mobile platform, where the parking agent is selected from the group consisting of a human being and an autonomous driving software application stored in a non-transitory memory enabling a sequence of processor executable steps for driving an automotive vehicle mobile platform;
determining a geographic location of the mobile platform;
transmitting verification information to a server, including an identification code associated with the parking agent, an identification code associated with the mobile platform, and the geographic location;
supplying the parking agent with the product exchange station location; and,
the parking agent delivering the mobile platform to the product exchange station location.

19. The method of claim 18 wherein permitting the package agent access to the locker includes:
the locker receiving verification information including an identifier associated with the package agent accessing the locker and an identifier associated with the locker; and,
the locker transmitting an acknowledgement that the locker has been accessed.

20. The method of claim 18 wherein permitting the package agent access to the locker includes permitting access to a package agent selected from the group consisting of a delivery agent inserting the product into the locker and a receiving agent removing the product from the locker.

21. The method of claim 18 wherein directing the package agent to the product exchange station location includes additionally supplying the package agent with a locker identifier and a locker access mechanism.

22. The method of claim 18 further comprising:
accepting agent requests selected from the group consisting of product exchange station locations, product exchange station times, locker types, destinations, and combinations thereof.

23. The method of claim 18 further comprising:
capturing images of a proximate geographic location to the locker; and,
transmitting the images to a server.

24. The method of claim 18 further comprising:
a first entity accepting product orders from a second entity;
wherein directing the package agent to the product exchange station includes:

a delivery exchange mechanism, associated with the first entity, supplying a delivery agent with the product, a locker identifier, a locker access mechanism, and a product delivery exchange station location; and, a receiving exchange mechanism, associated with the first entity, supplying a receiving agent with a locker identifier, a locker access mechanism, and a product receiving exchange station location.

25. The method of claim 18 further comprising:

a first entity accepting product orders from a second entity;

wherein directing the package agent to the product exchange station includes:

a delivery exchange mechanism, associated with a third entity, supplying a delivery agent with the product, a locker identifier, a locker access mechanism, and a product delivery exchange station location; and, a receiving exchange mechanism, associated with the third entity, supplying a receiving agent with a locker identifier, a locker access mechanism, and a product receiving exchange station location.

26. The method of claim 18 further comprising:

a first entity accepting product orders from a second entity;

wherein directing the package agent to the product exchange station includes:

a delivery exchange mechanism, associated with a fourth entity, supplying a delivery agent with the product, a locker identifier, a locker access mechanism, and a product delivery exchange station location; and, a receiving exchange mechanism, associated with the third entity, supplying a receiving agent with a locker identifier, a locker access mechanism, and a product receiving exchange station location.

27. The method of claim 18 wherein establishing the product exchange station location includes supplying a plurality of potential product exchange station location options.

28. The method of claim 18 wherein an agent receives a reward responsive to factors selected from the group consisting of platform starting location, platform destination location, distance between starting and destination parking locations, travel time between starting and destination parking locations, time of day, day of the week, locker size, product value, and combinations thereof.

29. The method of claim 18 further comprising: offering public access to a Wireless Local Area Network (WLAN) IEEE 802.11 (WiFi) hotspot.

30. The method of claim 18 further comprising: projecting media from a selectively enabled media projection subsystem, configured for attachment to the mobile platform.

31. The method of claim 30 further comprising:

transmitting an enablement signal to a server verifying that the media projection subsystem is enabled.

32. The method of claim 18 further comprising:

accepting a product destination request from a delivery agent;

wherein directing the package agent to the product exchange station location includes:

supplying the delivery agent with a locker identifier, a locker access mechanism, and a product delivery exchange station location; and, supplying a receiving agent with a locker identifier, a locker access mechanism, and a product receiving exchange station location.

33. The method of claim 18 wherein directing the agent to the product exchange station location includes directing the agent to a mobile platform route selected from the group consisting of a route with predetermined product exchange station locations and a route with non-predetermined product exchange station locations.

* * * * *